United States Patent
Moorman et al.

(10) Patent No.: US 9,322,470 B2
(45) Date of Patent: Apr. 26, 2016

(54) FLUID CIRCUIT CONTROL WITH ADAPTIVE DETERMINATION OF AN ACCUMULATOR RESERVE VOLUME

(71) Applicant: GM GLOBAL TECHNOLOGY OPERATIONS LLC, Detroit, MI (US)

(72) Inventors: Steven P. Moorman, Dexter, MI (US); Crystal Nassouri, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 14/328,993

(22) Filed: Jul. 11, 2014

(65) Prior Publication Data

US 2015/0260279 A1 Sep. 17, 2015

Related U.S. Application Data

(60) Provisional application No. 61/954,256, filed on Mar. 17, 2014.

(51) Int. Cl.
| | |
|---|---|
| *F16H 61/00* | (2006.01) |
| *F16H 61/688* | (2006.01) |
| *F16H 61/02* | (2006.01) |

(52) U.S. Cl.
CPC ........ *F16H 61/0025* (2013.01); *F16H 61/0204* (2013.01); *F16H 61/688* (2013.01); *F16H 2061/0034* (2013.01)

(58) Field of Classification Search
CPC ............ F16H 61/0021; F16H 61/0025; F16H 61/0204; F16H 61/065; F16H 61/067; F16H 61/068; F16H 61/12; F16H 61/688; F16H 2061/0034
See application file for complete search history.

(56) References Cited

U.S. PATENT DOCUMENTS

| | | | | |
|---|---|---|---|---|
| 2011/0264339 | A1* | 10/2011 | Wang | F16H 61/0021 192/3.51 |
| 2012/0137806 | A1* | 6/2012 | Moorman | F16H 61/688 74/340 |
| 2012/0144946 | A1* | 6/2012 | Lundberg | F16H 61/688 192/48.601 |
| 2014/0052334 | A1* | 2/2014 | Abboud | B60K 6/12 701/36 |

* cited by examiner

*Primary Examiner* — Jacob S Scott
(74) *Attorney, Agent, or Firm* — Quinn Law Group, PLLC

(57) ABSTRACT

A system includes a fluid pump, a hydraulic accumulator, and a controller. The controller calculates a reserve volume of the accumulator as a function of a component volume, leakage in the system, and a displacement of the pump, and executes a control action using the calculated reserve volume. The system may be a vehicle having input clutches and a dual clutch transmission (DCT) having gear forks. In such an embodiment, the accumulator and pump supply fluid pressure to the input clutches and gear forks in response to control signals from the controller. The controller executes a method that includes calculating the reserve volume of the accumulator as a function of a component volume, a volume of leakage in the system, and a displacement of the fluid pump. The method also includes executing a shift of the DCT using the calculated reserve volume.

15 Claims, 2 Drawing Sheets

FLUID CIRCUIT CONTROL WITH ADAPTIVE DETERMINATION OF AN ACCUMULATOR RESERVE VOLUME

CROSS-REFERENCE TO RELATED APPLICATIONS

This application claims the benefit of U.S. Provisional Application 61/954,256, filed Mar. 17, 2014, which is hereby incorporated by reference in its entirety.

TECHNICAL FIELD

The present disclosure relates to fluid circuit control with adaptive determination of an accumulator reserve volume.

BACKGROUND

Hydraulic fluid circuits supply fluid pressure to various fluidic components, such as valves, cylinders, and pistons or other actuators in a vehicle transmission. Primary hydraulic pressure is typically provided via a fluid pump. During periods in which the fluid pump cannot provide all of the required hydraulic pressure for a given task, supplemental hydraulic pressure may be provided via a hydraulic accumulator. The hydraulic accumulator thus acts as a standby energy storage device in such a fluid circuit.

In order to charge the accumulator with hydraulic fluid pressure, a valve is selectively opened when the fluid pump is running. Opening of the valve allows hydraulic fluid pressure to act on a piston located within the hydraulic accumulator. The resultant movement of the accumulator piston compresses a volume of nitrogen or another inert charging gas within the hydraulic accumulator. As the charging gas is compressed, hydraulic fluid enters and fills the hydraulic accumulator where the hydraulic fluid is then stored under pressure for later use. The minimal threshold volume of hydraulic fluid required for commanding a refilling of the hydraulic accumulator is referred to in the art as the recharge or reserve volume.

SUMMARY

A vehicle is disclosed herein having a hydraulic fluid circuit, a clutch, and a controller. The hydraulic fluid circuit includes a fluid pump and a hydraulic accumulator in fluid communication with the fluid pump. The controller is programmed or otherwise configured to periodically calculate a recharge/reserve volume of the hydraulic accumulator using a set of parameters, some of which may be adapted over time to more closely represent the changing performance of the vehicle. A goal of the present approach is to extend the operating life of the fluid pump, the hydraulic accumulator, and other components of the fluid circuit by calculating an optimal reserve volume, i.e., a minimum accumulator fluid volume at which the controller automatically commands a recharge of the hydraulic accumulator.

Rather than recharging the hydraulic accumulator only when the fluid volume of the accumulator drops below the fixed threshold volume, the reserve volume calculated herein is instead determined as a function of several different parameters. For instance, parameters in an example dual clutch transmission (DCT) embodiment in a vehicle may include a volume of hydraulic fluid required to actuate and maintain engagement of a set of input clutches and gear selection forks of the DCT, the latter hereinafter referred to as gear forks, a leakage volume describing an amount of fluid leakage attributed to actuation of the gear forks, a leakage volume attributed to maintaining engagement of the input clutches while operating in a steady state gear, and fluid displacement of the fluid pump.

Of these parameters, the leakage volumes and pump displacement are adapted values. That is, these values are expected to change over the life of the vehicle, and thus the leakage volumes and pump displacement are calculated and updated periodically by the controller to ensure a more accurate reflection of the true values of these parameters. The calculated reserve volume is then used by the controller as a control input in the overall control of the fluid circuit, for instance in the commanding of a gear shift.

In an example embodiment, a system includes a fluid pump, a hydraulic accumulator in fluid communication with the fluid pump, and a controller in electrical communication with the fluid pump and the hydraulic accumulator. The controller is programmed to calculate a reserve volume of the hydraulic accumulator as a function of a component volume, an amount of fluid leakage in the system, and a fluid displacement of the fluid pump, and to thereafter execute a control action with respect to the fluid pump and/or the hydraulic actuator using the calculated reserve volume.

The system may be a vehicle having a pair of input clutches and a dual clutch transmission (DCT) having clutch forks. In such an embodiment, the accumulator and the fluid pump selectively supply hydraulic fluid pressure to the input clutches and the clutch forks in response to control signals from the controller.

The vehicle in an example embodiment includes a pair of input clutches, a DCT having gear forks, a fluid pump, a hydraulic accumulator, and a controller. The hydraulic accumulator, which is in fluid communication with the fluid pump, selectively supplies fluid pressure along with the fluid pump to the input clutches and the gear forks in response to control signals. The controller is in electrical communication with the fluid pump and the hydraulic accumulator, and is programmed to calculate a reserve volume of the hydraulic accumulator as a function of the component volume, a volume of leakage in the system, and a displacement of the fluid pump. The controller also executes a shift of the DCT using control signals and the calculated reserve volume.

A method is also disclosed for use in a vehicle having a pair of input clutches, a DCT, a fluid pump, and a hydraulic accumulator in fluid communication with the fluid pump. The method includes calculating, via a controller, a reserve volume of the hydraulic accumulator as a function of a component volume, a volume of leakage in the system, and a displacement of the fluid pump, with the component volume including a known fluid volume of an actuator of one of the input clutches and gear forks of the DCT. The method also includes executing a shift of the DCT using the calculated reserve volume.

The above features and advantages and other features and advantages of the present invention are readily apparent from the following detailed description of the best modes for carrying out the invention when taken in connection with the accompanying drawings.

DETAILED DESCRIPTION

Figure 1:
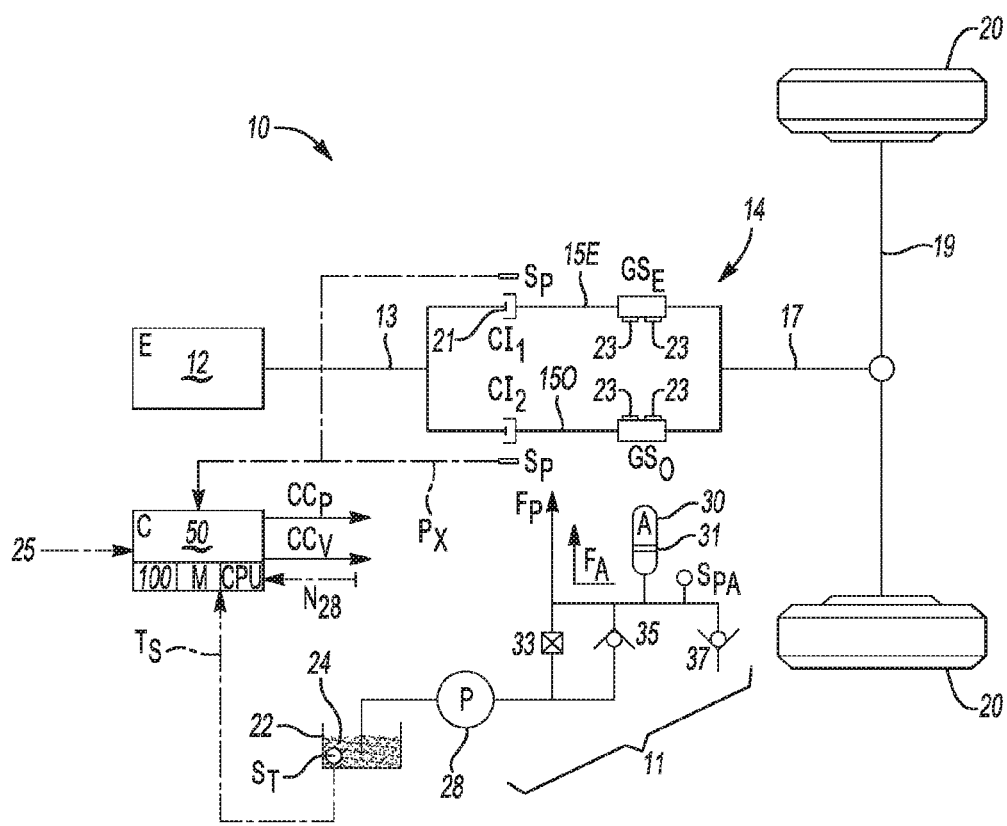
FIG. 1 is a schematic illustration of an example system in the form of a vehicle having a dual clutch transmission (DCT), a hydraulic fluid circuit that includes an accumulator, and a controller programmed to execute a method to thereby determine a recharge or reserve volume of the accumulator.

Referring to the drawings wherein like reference numbers correspond to like or similar components throughout the several figures, a system in the form of an example vehicle 10 is shown schematically in FIG. 1. The vehicle 10 includes an internal combustion engine (E) 12, a transmission 14, and a fluid circuit 11 having a hydraulic accumulator (A) 30. The transmission 14, which includes input members 15E and 15O in an example dual clutch transmission (DCT) embodiment, also includes an output member 17 that delivers output torque to a drive axle 19, and ultimately to a set of drive wheels 20.

The hydraulic accumulator 30 may be embodied as a generally cylindrical hydro-pneumatic accumulator of the type well known in the art. The hydraulic accumulator 30, when devoid of hydraulic fluid 24 ultimately supplied via a sump 22, contains a largely uncompressed charging volume of an inert gas such as nitrogen. Non-vehicular systems may also benefit from the present invention, provided the system includes an accumulator such as the hydraulic accumulator 30. For illustrative consistency, the vehicle 10 of FIG. 1 will be referred to hereinafter as an example system.

The vehicle 10 also includes a controller (C) 50. As described below, the controller 50 is operable to periodically calculate a recharge or reserve volume of the hydraulic accumulator 30, and to thereafter execute a control action with respect to the vehicle 10 using the calculated reserve volume. The controller 50 is programmed or otherwise configured to store and access process instructions embodying a method 100, an example embodiment of which is described below with reference to FIGS. 2 and 3. The controller 50 may include a processor/CPU and sufficient memory M, at least some of which is tangible and non-transitory. That is, the memory M may include sufficient read only memory (ROM), random access memory (RAM), electrically-programmable read-only memory (EPROM), flash memory, etc., and any required circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry.

As is known in the art, a dual clutch transmission or DCT is a type of transmission that separates respective oddly-numbered and evenly-numbered gear sets $GS_O$ and $GS_E$ onto the different input members 15E and 15O of the transmission 14, and that selects the evenly-numbered or oddly-numbered gear sets $GS_E$ or $GS_O$ via separate actuation of first or second input clutches $CI_1$ or $CI_2$. Engagement of the first input clutch $CI_1$ thus connects an output shaft 13 of the engine 12 to input member 15E, while engagement of the second input clutch $CI_2$ connects the output shaft 13 to the odd input member 15O. As is also well known in the art, the individual gears of a DCT, e.g., $1^{st}$-$8^{th}$ gear and reverse, are selected via actuation of gear forks 23, shown schematically in FIG. 1, for corresponding gear synchronizers (not shown). As is known in the art, gear forks such as the gear forks 23 are used in a DCT to select between different forward drive or reverse gear modes. Four gear forks 23 may be used in an example embodiment, for example a gear fork 23 for $1^{st}$ and $7^{th}$ gears, $3^{rd}$ and $5^{th}$ gears, $4^{th}$ and reverse gears, and $2^{nd}$ and $6^{th}$ gears.

The gear forks 23 and the first and second input clutches $CI_1$ and $CI_2$ of the vehicle 10 shown in FIG. 1 require hydraulic fluid pressure for actuation or engagement. To that end, the hydraulic circuit 11 includes the fluid sump 22 containing a supply of the hydraulic fluid 24, a fluid pump (P) 28 having a pump speed ($N_{28}$), and the hydraulic accumulator 30 noted above, all of which are fluidly connected to each other via conduit such as hoses, tubing, and any required hydraulic fittings. Different flow paths and valve combinations may be envisioned to connect the fluid pump 28 and hydraulic accumulator 30 to the transmission 14 and the input clutches $CI_1$ and $CI_2$, and therefore the specific configuration of the fluid circuit 11 of FIG. 1 is non-limiting. A control valves 33 may be disposed between the fluid pump 28 and the transmission 14. When the valve 33 is opened, primary hydraulic pressure (arrow $F_P$) flows to the transmission 14 or inputs clutches $CI_1$, $CI_2$.

In an example embodiment, the fluid circuit 11 may include a control valve 33 and a one-way check valve 35. The controller 50 selectively opens the control valve 33 via valve control signals (arrow $CC_V$) to direct fluid 24 to wherever the fluid 24 is needed. Likewise, the controller 50 also transmits pump control signals (arrow $CC_P$) to the fluid pump 28 to turn the fluid pump 28 on or off as needed, with an on state of the fluid pump 28 delivering primary hydraulic pressure (arrow $F_P$) to the input clutches $CI_1$, $CI_2$, and/or the gear forks 23. Discharge of pressure from the hydraulic accumulator 30 provides auxiliary hydraulic pressure (arrow $F_A$) to components, e.g., the input clutches $CI_1$, $CI_2$ and the gear forks 23 in this example, either alone or together with the primary hydraulic pressure (arrow $F_P$). A pressure sensor $S_{PA}$ may be positioned with respect to the hydraulic accumulator 30 to measure pressure at that location of the fluid circuit 11, and a line blow off valve 37 may be positioned downstream of the hydraulic accumulator 30 to vent excess pressure as needed. To determine when to recharge the hydraulic accumulator 30, i.e., when to transmit the valve control signals (arrow $CC_V$) and the pump control signals (arrow $CC_P$), the controller 50 receives and/or calculates a set of parameters (arrow 25). Examples of the parameters 25 are described in further detail below with reference to FIGS. 2 and 3.

Figure 2:
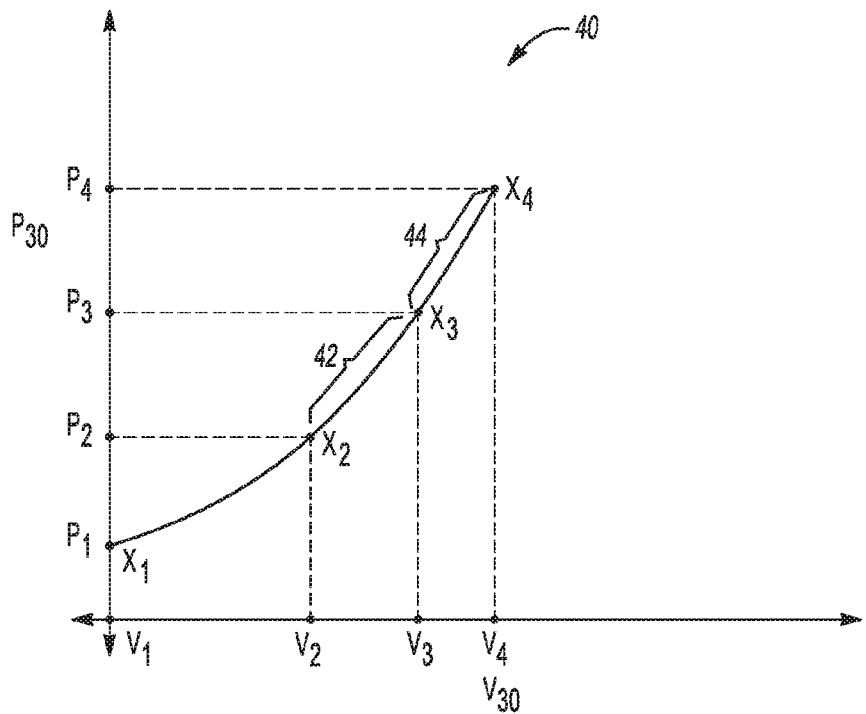
FIG. 2 is a schematic pressure vs. volume chart usable by the controller of FIG. 1 in calculating the reserve volume via the present method.

Still referring to FIG. 1, the hydraulic accumulator 30 includes a piston 31 that compresses charging gas in the hydraulic accumulator 30 as noted above. When fluid pressure acting on the piston 31 overcomes viscous drag of a piston seal within the hydraulic accumulator 30, the piston 31 will begin to move in what is referred to as a compression stroke. Just before such movement of the piston 31 begins, gas pressure in the hydraulic accumulator 30 is at equilibrium with fluid pressure acting in the fluid circuit 11. This equilibrium pressure point is known as the accumulator pre-charge pressure, i.e., the pressure at zero fluid volume. This value, shown as control point X1 of FIG. 2, is used to calculate the current gas volume of the hydraulic accumulator 30, as is well known in the art. Relative to this point, a recharge or reserve volume of the hydraulic accumulator 30 is the minimum fluid volume at which the controller 50 of FIG. 1 will take action to control the fluid pump 28 and the control valve 33 to refill the hydraulic accumulator 30.

It is recognized herein that any movement of the gear forks 23 can cause some amount of fluid leakage to occur. For instance, the control valve 33 and other mode, flow, or pressure control valves (not shown) downstream of the fluid pump 28 and hydraulic accumulator 30 have internal clearances with their bores, however slight, past which pressurized fluid may leak. As part of the method 100, therefore, the controller 50 is programmed to compensate for any worst case leakage values, values that can change over time with temperature or as components of the fluid circuit 11 age and degrade. Therefore, sump temperature (arrow $T_S$) measured by a temperature sensor ($S_T$) may be used as part of the fluid circuit 11 to provide such temperature information to the controller 50. Likewise, control of the input clutches $CI_1$ and $CI_2$ in the example DCT embodiment of FIG. 1 relies on position signals (arrows $P_X$) from position sensors $S_P$, e.g., Hall effect sensors, positioned with respect to linear actuators/clutch apply pistons 21 of the first and second input clutches $CI_1$ and $CI_2$. The received position signals (arrows $P_X$) are also used in parts of the method 100 as set forth below.

Figure 3:
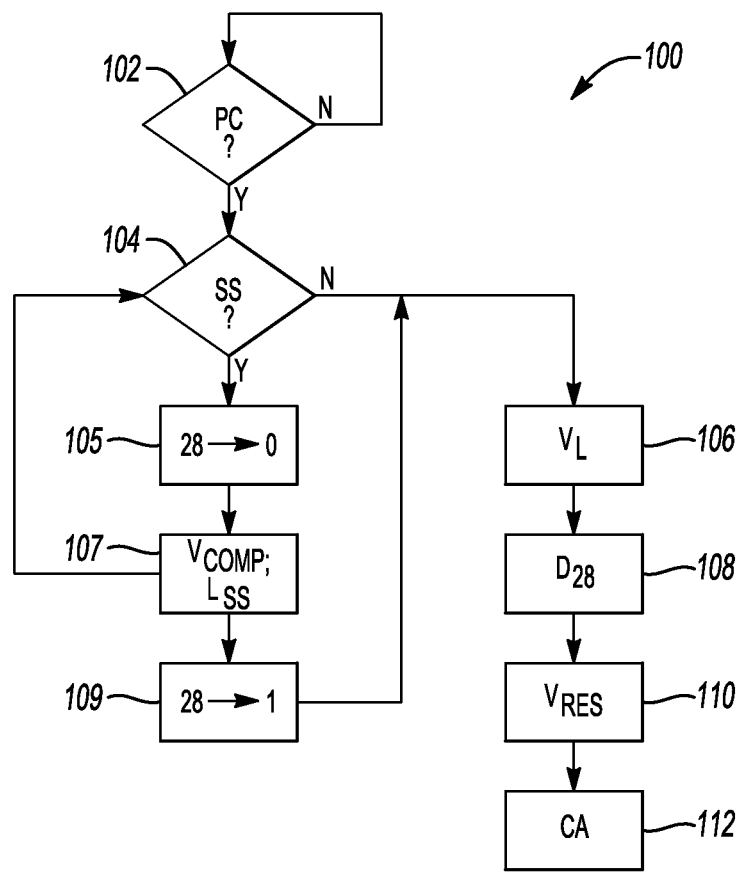
FIG. 3 is a flow chart describing an example method for determining a recharge volume of a hydraulic accumulator of the type used in the vehicle of FIG. 1.

Referring to FIG. 2, a pressure vs. volume curve 40 is shown for the hydraulic accumulator 30 of FIG. 1, with accumulator pressure ($P_{30}$) plotted on the vertical axis and accumulator volume ($V_{30}$) plotted on the horizontal axis, e.g., in bar and milliliters, respectively. The method 100 described below with reference to FIG. 3 is designed to calculate an optimal reserve volume for the hydraulic accumulator 30 so as to reduce the number of charge/discharge cycles of the hydraulic accumulator 30 over the operating life of the fluid pump 28 and hydraulic accumulator 30 shown in FIG. 1. The curve 40 depicts four control points X1, X2, X3, and X4, each corresponding to a particular pressure and volume pair. That is, control point X1 corresponds to a first pressure and volume pair (P1, V1), and the second control point X2 corresponds to a second pressure and volume pair (P2, V2). Likewise, the control point X3 corresponds to a third pressure and volume pair (P3, V3), while the fourth control point X4 corresponds to a fourth pressure and volume pair (P4, V4).

In the pressure vs. volume curve 40 of FIG. 2, the first control point X1 represents the pre-charge pressure P1 and volume V1 of the hydraulic accumulator 30 of FIG. 1. The pre-charge pressure P1 is the pressure of the hydraulic accumulator 30 at an accumulator volume V1 of zero, i.e., when the hydraulic accumulator 30 is devoid of fluid 24 and filled with inert charging gas. Such a control point X1 may be used by the controller 50 in the typical manner, such as to calculate a volume of charging gas, and ultimately the fluid 24 held by the hydraulic accumulator 30 at any given time. The second control point X2 corresponds to a minimum required pressure P2 needed to maintain the first and second input clutches $CI_1$ and $CI_2$ and the gear forks 23 for the clutch synchronizers of the transmission 14 at a maximum clutch torque ($T_{C, MAX}$). This pressure P2 is converted by the controller 50 to a corresponding volume V2 as explained below with reference to FIG. 3.

The volume V3 corresponding to the third control point X3 of FIG. 2 is the reserve volume that is being solved for by the controller 50 in the present invention, with a corresponding pressure P3. Finally, the pressure P4 corresponding to the fourth control point X4 is the maximum accumulator pressure, i.e., a calibrated value converted to a volume V4. Between the various control points X1-X4, a first accumulator range 42 is defined between the control points X2 and X3, and indicates the actual reserve volume range as calculated by the controller 50 and modified by the parameters (arrow 25) of FIG. 1. A second accumulator range 44 defined between control points X3 and X4 is the working volume range for the hydraulic accumulator 30. The controller 50 of FIG. 1 thus turns on the pump 28 whenever the volume of the hydraulic accumulator 30 reaches volume V3, i.e., control point X3, and turns the fluid pump 28 off again whenever the volume of the hydraulic accumulator 30 reaches volume V4, i.e., the control point X4 or the maximum accumulator pressure. The calculation and use of the various pressure and volume parameters of FIG. 2 will now be explained in further detail with reference to FIG. 3.

FIG. 3 depicts an example embodiment of the method 100 noted above, which is used to determine the reserve volume of the hydraulic accumulator 30. The reserve volume ($V_{RES}$), i.e., the first accumulator range 42 or change in volume between V2 and V3 of FIG. 2, is ultimately determined as a function of several parameters (arrow 25), and in general terms may be represented as:

$$V_{RES} = V_{COMP} + V_L - D_{28}$$

where $V_{RES}$ is the reserve volume being determined by the controller 50 as set forth herein for use in a control action of the vehicle 10, $V_{COMP}$ and $V_L$ are respective component and leakage volumes of the component being fed with hydraulic fluid 24, and $D_{28}$ is the fluid displacement of the fluid pump 28 of FIG. 1. Each term is described below.

Beginning with step 102, the controller 50 of FIG. 1 evaluates predetermined conditions (PC) for execution of the method 100. Example entry conditions may be a certain number of key cycles, for instance, or, if calculation is to be performed continuously/in real time, threshold states such as the engine 12 is running and the sump temperature (arrow $T_S$) is above a threshold. The method 100 proceeds to step 104 once all entry conditions are satisfied.

Step 104 entails determining whether the transmission 14 is operating in a steady state (SS) gear, e.g., cruising in $4^{th}$ gear. Step 104 may entail processing internal shift logic or verifying the engage/release positions of the various input clutches $CI_1$, $CI_2$, and the gear forks 23 to determine the transmission state the transmission 14 is presently operating in. Another way to execute step 104 is to determine whether a shift of the transmission 14 has been requested in logic or by actions of the driver of the vehicle 10. The method 100 proceeds to step 105 if the transmission 14 is in a steady state gear, and to step 106 if the transmission is not in steady state.

At step 105, the controller 50 of FIG. 1 turns off the fluid pump 28, as indicated in FIG. 3 by a binary state of 0, via control signals (arrow $CC_P$) of FIG. 1. The method 100 proceeds to step 107 when the fluid pump 28 is off.

At step 106, the controller 50 calculates the leakage volume $V_L$ noted above. The leakage volume $V_L$ may be calculated as follows:

$$V_L = t_S \cdot L_{SS} + 4 V_{FL}$$

where $t_S$ is a calibrated duration in the form of a shift time such as 3-4 seconds, $L_{SS}$ is the largest steady state leak rate from step 107 as explained below, e.g., from an immediately prior iteration of the method 100, and $V_{FL}$ is the leak volume of the largest leak volume of the gear forks 23, e.g., during a predetermined combination of shifts in the calibrated duration $t_S$. The values for $t_S$ and the numeral "4" as used in the above formula are both calibrations, in this instance providing the ability to accomplish four (4) shifts in $t_S$ seconds.

These leakage rates may be learned by the controller 50 based on the depressurization rate of the hydraulic accumulator 30 of FIG. 1 and known gas laws. For example, $L_{SS}$ may be calculated at step 107 in an immediately prior iteration of the method 100 when a shift requiring any of the gear forks 23 is not commanded, and fork leakage $V_{FL}$ may be calculated at step 106 when such a fork shift is being commanded. It is recognized that some steady state fluid leakage is included into the fork leakage volume $V_{FL}$, but the above equation may still be used for simplicity without sacrificing functional accuracy.

As will be appreciated by those of ordinary skill in the art, fluid leakage causes pressure in the hydraulic accumulator 30 to bleed down over time. The leakage rates noted above may therefore be calculated based on the depressurization/decreasing pressure rate of the hydraulic accumulator 30 and gas law physics when the fluid pump 28 is in an off state, i.e., at step 107. Maintaining engagement of the input clutches $CI_1$, $CI_2$ in a steady state gear can also produce fluid leakage past any valves supplying the clutches $CI_1$, $CI_2$. Each gear state does not experience fluid leakage uniformly with respect to other gear states. Thus, the controller 50 of FIG. 1 can determine the volume of fluid 24 consumed during steady state driving with the fluid pump 28 off and divide by a calibrated duration of the test, e.g., 3-4 seconds, with the result being the steady state leakage ($L_{SS}$) expressed as a rate, e.g., L/s. The method 100 then proceeds to step 108.

Step 107 entails calculating the component volume $V_{COMP}$ and the steady state leak volume $L_{SS}$ noted above. Briefly with reference to FIG. 2, the volume V2 is the volume of fluid 24 required to maintain maximum clutch torque capacity, which is a maximum clutch torque capacity for a given one input clutch $CI_1$ or $CI_2$ and the largest of the gear forks 23. As is known in the art, maximum clutch torque capacity is a combination of learned (adapted) clutch torque vs. position characteristics, wherein for a given position of linear actuator/clutch piston used to engage the clutches $CI_1$, $CI_2$, or gear forks 23, the controller 50 calculates the clutch torque capacity and possibly records it in memory M.

Maximum clutch torque capacity is also a function of the learned clutch pressure vs. position characteristics (PTP), also usually calibrated in a lookup table and possibly adapted periodically over time. In other words, the controller 50 determines the pressure required to hold maximum torque on a specific worst-case combination of clutches and forks, which varies with the design of the transmission 14, and then converts that pressure into the component volume V2, i.e., PV/T=a constant, are determined by the adapted pre-charge pressure and the measured sump temperature $T_S$.

The component volume, $V_{COMP}$, is a volume of the fluid 24 needed for an actuator to move a predetermined combination of gear forks 23 and input clutches $CI_1$, $CI_2$, e.g., four forks and two clutches, for a calibrated shift sequence. A hypothetical multiple step shift sequence is a 3-4 second shift simulating a possible rapid upshift or downshift sequence, or another sequence in which auxiliary pressure ($F_A$) from the hydraulic accumulator 30 of FIG. 1 is needed to supplement the primary hydraulic pressure ($F_P$) from the fluid pump 28.

To determine the amount of fluid 24 needed to move four gear forks 23 and two input clutches $CI_1$ and $CI_2$, the position sensors $S_P$ used for measuring the changing linear position of the position-controlled linear actuators or clutch apply pistons 21 for these devices in FIG. 1 provide position signals ($P_X$) to the controller 50. The received position signals $P_X$ describe the distance traveled by the linear actuators so as to engage the gear forks 23 and/or input clutches $CI_1$, $CI_2$. Multiplying these distances by the known piston cross-sectional areas (A), i.e., calibration values stored in memory M, provides the component volumes per linear actuator.

The total component volume $V_{COMP}$ of step 107 therefore depends on the shift which is used as the calibrated "worst case" scenario. For instance, the controller 50 may use a rapid 3-4 second sequence of four shifts of the transmission 14, i.e., a baseline shift sequence which almost certainly will require auxiliary hydraulic pressure (arrow $F_A$ of FIG. 1) from the accumulator 30. The total component volume $V_{COMP}$ for such an example shift sequence may be determined as follows:

$$V_{COMP}=2(CI_1+CI_2)+2(V_{F,L})$$

to provide a total amount of component volume ($V_{COMP}$) required for a sequence of four clutch actuations, i.e., two $CI_1$ and two $CI_2$, and two gear fork 23 actuations.

The largest fork leakage volumes ($V_{F,L}$) in this same equation may be used for simplicity because it may be relatively cumbersome to track precisely which gears were being used and when in a specific shift maneuver. Using a worst case scenario, in other words, this value provides sufficient accuracy while improving programming simplicity. The scenario used for calibration should be one in which the fluid pump 28 is not large enough to support the predetermined number of shifts in a relatively short period of time, e.g., 3-4 seconds. The method 100 thus ensures that the hydraulic accumulator 30 has a sufficient reserve volume in the unlikely event that a driver should happen to attempt to execute the predetermined number of shifts. The method 100 then proceeds to step 109.

At step 108, the controller 50 determines pump displacement ($D_{28}$) and component volume ($V_{COMP}$). Pump displacement ($D_{28}$) may also decrease over the life of the fluid pump 28, as well as with changing temperatures. Thus, the controller 50 may determine the fluid output of the fluid pump 28 while the fluid pump 28 is on, e.g., $D_{28}$=(Pump Output)($t_S$), with the value of Pump Output known from determining the pressurization rate of the accumulator with the pump on, converting to a rate of volume change using the gas laws, and subtracting the previously determined leakage rate, a known design of the fluid pump 28, sump temperature (arrow $T_S$), and possibly other adapted values. The method 100 then proceeds to step 110.

At step 109, the controller 50 turns the fluid pump 28 back on, again via communication of the pump control signals (arrow $CC_P$) to the fluid pump 28. The method 100 then proceeds to step 106.

Step 110 entails calculating the reserve volume $V_{RES}$, as follows:

$$V_{RES}=V_{COMP}+V_L+L_{SS}-D_{28}$$

where $V_{COMP}$ and $L_{SS}$ are previously calculated at step 107, the leakage volume $V_L$ is calculated at step 106, and pump displacement $D_{28}$ is calculated at step 108, all of which are described above. Once the calculated reserve volume ($V_{RES}$) is known, the method 100 proceeds to step 112.

At step 112, the controller 50 may use the calculated reserve volume ($V_{RES}$) from step 110 to execute a control action with respect to the vehicle 10. For example, knowing the reserve volume ($V_{RES}$), the controller 50 of FIG. 1 can command the fluid pump 28 to turn on whenever volume reaches the control point X3 of FIG. 2. Likewise, the controller 50 can turn the fluid pump 28 back off again at control point X4, i.e., when volume within the accumulator 30 of FIG. 1 reaches V4.

Using the method 100, the controller 50 can, relative to conventional approaches, more accurately compensate for fluid leakage and system wear over time. In this manner, the life of the fluid pump 28, the hydraulic accumulator 30, and any associated components may be extended relative to conventional approaches which use a hard threshold volume with non-adaptive control to trigger recharging of the accumulator. The number of lifetime strokes of the piston 31 used in the hydraulic accumulator 30 of FIG. 1 may be reduced such that leakage of charging gas within the hydraulic accumulator 30 will be minimized, with the hydraulic accumulator 30 holding fluid 34 even near the end of the useful life of the transmission 14. These and other benefits will be readily appreciated by those of ordinary skill in the art in view of the present disclosure.

While the best modes for carrying out the invention have been described in detail, those familiar with the art to which this invention relates will recognize various alternative designs and embodiments for practicing the invention within the scope of the appended claims.

The invention claimed is:

1. A system comprising:
a component having a component volume;
a fluid pump;
a hydraulic accumulator in fluid communication with the fluid pump; and
a controller in electrical communication with the fluid pump and the hydraulic accumulator, wherein the controller is programmed to calculate a reserve volume of the hydraulic accumulator as a function of the component volume, a volume of leakage in the system, and a displacement of the fluid pump, and to execute a control action with respect to the system using the calculated reserve volume.

2. The system of claim 1, wherein the system is a vehicle having, as the component, a pair of input clutches and a dual clutch transmission (DCT) having gear forks, and wherein the hydraulic accumulator and the fluid pump selectively supply fluid pressure to the input clutches and the gear forks in response to control signals from the controller.

3. The system of claim 2, wherein the control action is a shift of the DCT.

4. The system of claim 2, wherein the volume of leakage in the system includes a volume of leakage occurring during operation in a steady state gear of the DCT.

5. The system of claim 2, wherein the volume of leakage in the system includes a volume of leakage occurring during a predetermined combination of shifts of the DCT within a calibrated duration.

6. The system of claim 5, wherein the predetermined number of shifts of the DCT is four shifts, and the calibrated duration is less than four seconds.

7. The system of claim 2, wherein the component volume is a volume of fluid required to maintain a maximum clutch torque capacity on a predetermined number of the input clutches and gear forks.

8. A vehicle comprising:
a pair of input clutches;
a dual clutch transmission (DCT) having gear forks;
a fluid pump;
a hydraulic accumulator in fluid communication with the fluid pump, wherein the hydraulic accumulator and the fluid pump selectively supply fluid pressure to the input clutches and the gear forks in response to control signals; and
a controller in electrical communication with the fluid pump and the hydraulic accumulator, wherein the controller is programmed to calculate a reserve volume of the hydraulic accumulator as a function of a component volume, a volume of leakage in the system, and a displacement of the fluid pump, wherein the component volume is a volume of fluid required to maintain a maximum clutch torque capacity on a predetermined number of the input clutches and gear forks, and to execute a shift of the DCT using control signals and the calculated reserve volume.

9. The vehicle of claim 8, wherein the volume of leakage in the system includes a volume of leakage occurring during operation in a steady state gear of the DCT.

10. The vehicle of claim 8, wherein the volume of leakage in the system includes a volume of leakage occurring during a predetermined combination of shifts of the DCT within a calibrated duration.

11. The vehicle of claim 10, wherein the predetermined number of shifts of the DCT is four shifts, and the calibrated duration is less than four seconds.

12. A method for use in a vehicle having a pair of input clutches, a dual clutch transmission (DCT) having gear forks, a fluid pump, and a hydraulic accumulator in fluid communication with the fluid pump, the method comprising:
calculating, via a controller, a reserve volume of the hydraulic accumulator as a function of a component volume, a volume of leakage in the system, and a displacement of the fluid pump, wherein the component volume is a volume of fluid required to maintain a maximum clutch torque capacity on a predetermined number of the input clutches and the gear forks; and
executing a shift of the DCT using the calculated reserve volume.

13. The method of claim 12, wherein the volume of leakage in the system includes a volume of leakage occurring during operation in a steady state gear of the DCT.

14. The method of claim 13, wherein the volume of leakage in the system further includes a volume of leakage occurring during a predetermined combination of shifts of the DCT within a calibrated duration.

15. The method of claim 14, wherein the predetermined number of shifts of the DCT is four shifts, and the calibrated duration is less than four seconds.

* * * * *